(12) United States Patent
Ballinger et al.

(10) Patent No.: US 7,165,118 B2
(45) Date of Patent: Jan. 16, 2007

(54) LAYERED MESSAGE PROCESSING MODEL

(75) Inventors: Keith W. Ballinger, North Bend, WA (US); Hervey O. Wilson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 349 days.

(21) Appl. No.: 10/918,907

(22) Filed: Aug. 15, 2004

(65) Prior Publication Data

US 2006/0034431 A1 Feb. 16, 2006

(51) Int. Cl.
*G06F 15/16* (2006.01)

(52) U.S. Cl. .................. 709/245; 709/238; 709/246; 370/389; 370/474; 370/475

(58) Field of Classification Search ............ 709/203, 709/229, 230, 238, 245, 246; 370/389, 464–469, 370/474–475; 707/101; 719/315, 328
See application file for complete search history.

(56) References Cited

U.S. PATENT DOCUMENTS

| | | | | |
|---|---|---|---|---|
| 5,675,736 | A | 10/1997 | Brady et al. ............... | 709/239 |
| 6,226,666 | B1 | 5/2001 | Chang et al. .............. | 709/202 |
| 6,321,336 | B1* | 11/2001 | Applegate et al. .......... | 726/11 |
| 6,425,017 | B1 | 7/2002 | Dievendorff et al. ....... | 719/315 |
| 6,876,653 | B1* | 4/2005 | Ambe et al. ............... | 370/389 |
| 7,020,697 | B1* | 3/2006 | Goodman et al. .......... | 709/223 |
| 2003/0005122 | A1 | 1/2003 | Freimuth et al. | |
| 2003/0028669 | A1* | 2/2003 | Batsleer et al. ............ | 709/240 |
| 2004/0024731 | A1 | 2/2004 | Cabrera et al. | |
| 2004/0111533 | A1 | 6/2004 | Beisiegel et al. | |
| 2004/0221040 | A1* | 11/2004 | Lisitsa et al. ............. | 709/226 |
| 2005/0182854 | A1* | 8/2005 | Pinkerton et al. ......... | 709/238 |
| 2006/0080352 | A1* | 4/2006 | Boubez et al. ............ | 707/102 |
| 2006/0104308 | A1* | 5/2006 | Pinkerton et al. ......... | 370/469 |

FOREIGN PATENT DOCUMENTS

| | | | |
|---|---|---|---|
| EP | 1 478 160 A1 | * | 11/2004 |
| EP | 1 569 095 A1 | * | 8/2005 |
| WO | WO 02/39696 A2 | * | 5/2002 |

OTHER PUBLICATIONS

Parikh et al. "Desribe business process activities as Web services". Oct. 2005.*

(Continued)

*Primary Examiner*—ThuHa Nguyen
(74) *Attorney, Agent, or Firm*—Workman Nydegger

(57) ABSTRACT

Methods, systems, and computer program products for processing network messages in a manner that simplifies messaging application logic. Processing layers of a messaging system architecture that may include a transport layer, a channel layer, a send/receive layer, a service/client layer, and potentially others, are aware of an End Point Reference ("EPR") within a network message The transport layer retrieves message data from a message transport. The channel layer de-serializing the network message consistent with an underlying type system. The send/receive layer filters and dispatches the network message to messaging logic (other layers or application logic) based on the EPRs. The service/client message layer dispatches the network message to messaging application logic based on the EPRs. These EPR aware message processing layers implement dispatch logic so that messaging applications written for the architecture need not provide the dispatch logic, simplifying the messaging application logic and development of the messaging application itself.

39 Claims, 8 Drawing Sheets

OTHER PUBLICATIONS

Sahai, A.; et al., "Message Tracking in Soap-Based Web Services," *NOMS 2002 IEEE/IFIP Network Operations and Management Symposium Management Solutions for the New Communications World*, Apr. 2002, Cat. No. 02CH37327, p. 33-47.

Felber, P.; et al., "Scalable Filtering of XML Data for Web Services," *IEEE Internet Computing*, Jan.-Feb. 2003, vol. 7, No. 1, p. 49-57.

Thomas, J.P.; et al., "Modeling of Web Services Flow," *Proceedings IEEE International Conference on E-Commerce* CEC 2003, Jun. 2003, p. 391-8.

Vogels, W., "Web Services are not Distributed Objects," *IEEE Internet Computing*, Nov.-Dec. 2003, vol. 7, No. 6, p. 59-66.

Koudas, N.; et al., "Data Stream Query Processing," *Fourth International Conference on Web Information Systems Engineering*, Dec. 2003, p. 374.

\* cited by examiner

LAYERED MESSAGE PROCESSING MODEL

CROSS-REFERENCE TO RELATED APPLICATIONS

N/A

BACKGROUND OF THE INVENTION

1. The Field of the Invention

The present invention relates to a message processing system. More specifically, the present invention relates to processing one or more received network messages in a manner that simplifies messaging application logic.

2. Background and Related Art

Web Services ("WS") generally refers to a set of standards for integrating Web-based applications using the eXtensible Markup Language ("XML"), Simple Object Access Protocol ("SOAP"), Web Services Definition Language ("WSDL"), and Universal Description, Discovery and Integration ("UDDI") standards over an Internet Protocol network. Through Web Services, entities, such as business organizations and customers, are able to communicate with each other through messages without having to expose implementation details of each entity's information systems. Among other things, this allows entities (i) to maintain appropriate security measures by keeping those implementation details secured behind a firewall, and (ii) to make changes without concern for disrupting applications that otherwise may depend on those implementation details. In particular, Web Services tag message data using XML, transfer message data using SOAP, describe what services are available using WSDL, and list available services using UDDI.

By integrating Web-based applications, Web Services share business logic, data, and processes through a well-defined interface. This sharing may occur over a network or between applications and application objects within a single computer system. In following a well-defined interface, Web Services allow applications that are developed independently to communicate with each other without having to code customized interfaces between the applications. Furthermore, by using XML to communicate data, Web Services are independent of the operating system on which they run and the programming language in which they were written. Accordingly, applications written in popular Web design languages such as Java and Perl, as well as more traditional languages such as C++, C#, Basic, etc., are able to exchange data with each other in a relatively simple and straightforward manner.

One mechanism for identifying message end-points in Web Services is known as End Point References ("EPRs"). In SOAP-based messaging, EPRs are represented by a Uniform Resource Locator ("URL") and a collection of zero or more end-point reference properties that are promoted into SOAP headers when sending a message to a particular EPR. End-point reference properties allow a finer granularity of addressing, beyond what typically can be achieved through a URL alone.

Although some form of layered models for common message processing tasks may exist, in the past, a significant obstacle developers have faced is the need to code dispatch logic in order to route messages to the appropriate business/application logic in accordance with the messages EPRs. Because dispatch logic tends to be highly complex, dispatch logic is error prone, and therefore requires significant development and testing resources. The complex nature of dispatch logic also leads to more complicated business/application logic than would otherwise be required. In addition, a substantial amount of application design and code is common to most dispatch logic, even for diverse applications. As a result, Web Service developers often invest considerable resources producing what essentially represents the same code over and over again, which prevents the deployment of development resources to creating and improving the Web Services themselves.

Accordingly, a message system architecture that simplifies messaging application logic is desired so that development resources can be focused on adding value in the messaging applications.

BRIEF SUMMARY OF THE INVENTION

These and other problems with the prior art are overcome by the present invention, which is directed toward processing network messages in a manner that simplifies messaging application logic. Unlike traditional layered messaging processing models, one or more message processing layers of a messaging system architecture in accordance with the present invention are aware of the EPR of a network message, which allows the message processing to operate in extensible and customizable ways while maintaining isolation between the layers. A messaging system architecture with EPR aware message processing layers can implement dispatch logic so that messaging applications written for the messaging system architecture need not provide the dispatch logic, which simplifies the messaging application logic as well as the development of the messaging application itself.

In accordance with example method embodiments, a transport message layer of a messaging system architecture for a computer system produces a network message that conforms to a particular message specification by retrieving message data from a message transport. The network message includes a collection of end point reference properties. A channel message layer of the messaging system architecture transforms the network message by de-serializing the network message to make the message consistent with an underlying type system of the messaging system architecture. A send/receive message layer of the messaging system architecture filters the network message and dispatches the network message to messaging logic that corresponds to the collection of end point reference properties. This message logic may be application logic or other logic within the messaging system architecture, such as messaging logic within a service/client message layer. The service/client message layer dispatches the network message to messaging application logic that corresponds to the collection of end point references properties so that the application logic need note provide dispatch logic for the network message.

The messaging application logic may include one or more messaging application objects which are registered with a logic dispatcher in the service/client message layer by identifying one or more end point reference properties of the messaging application objects to the logic dispatcher. Dispatching the network message to a messaging application object or a method within the messaging application object may include the logic dispatcher examining the collection of end point reference properties and matching the network message to the messaging application object or a messaging application method.

Similarly, the logic dispatcher may be registered with a service dispatcher in the service/client layer by identifying the logic dispatcher and one or more end point reference properties of the messaging application object to the service dispatcher. Dispatching the network message to the logic dispatcher may include the service dispatcher examining the collection of end point reference properties and matching the network message to the logic dispatcher based on the collection of end point reference properties.

Likewise, a receiver may be registered with a receiver dispatcher in the send/receive layer by identifying the receiver and one or more end point reference properties of the messaging application object to the receiver dispatcher. Dispatching the network message to the receiver may include the receiver dispatcher examining the collection of end point reference properties and matching the network message to the receiver based on the collection of end point reference properties.

Within the channel layer, a channel may be registered with a channel dispatcher by identifying the channel and one or more end point reference properties of the messaging application object to the channel dispatcher. Dispatching the network message to the channel may include the channel dispatcher examining the collection of end point reference properties and matching the network message to the channel based on the collection of end point reference properties.

And finally, in the transport layer, a transport may be registered with a transport dispatcher by identifying the transport and one or more end point reference properties of the messaging application object to the transport dispatcher. Dispatching the network message to the transport may include the channel dispatcher examining the collection of end point reference properties and matching the network message to the transport based on the collection of end point reference properties.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE PREFERRED EMBODIMENTS

The present invention relates to methods, systems, and computer program products for processing network messages. The embodiments of the present invention may comprise one or more special purpose and/or one or more general purpose computers including various computer hardware, as discussed in greater detail below.

Figure 1:
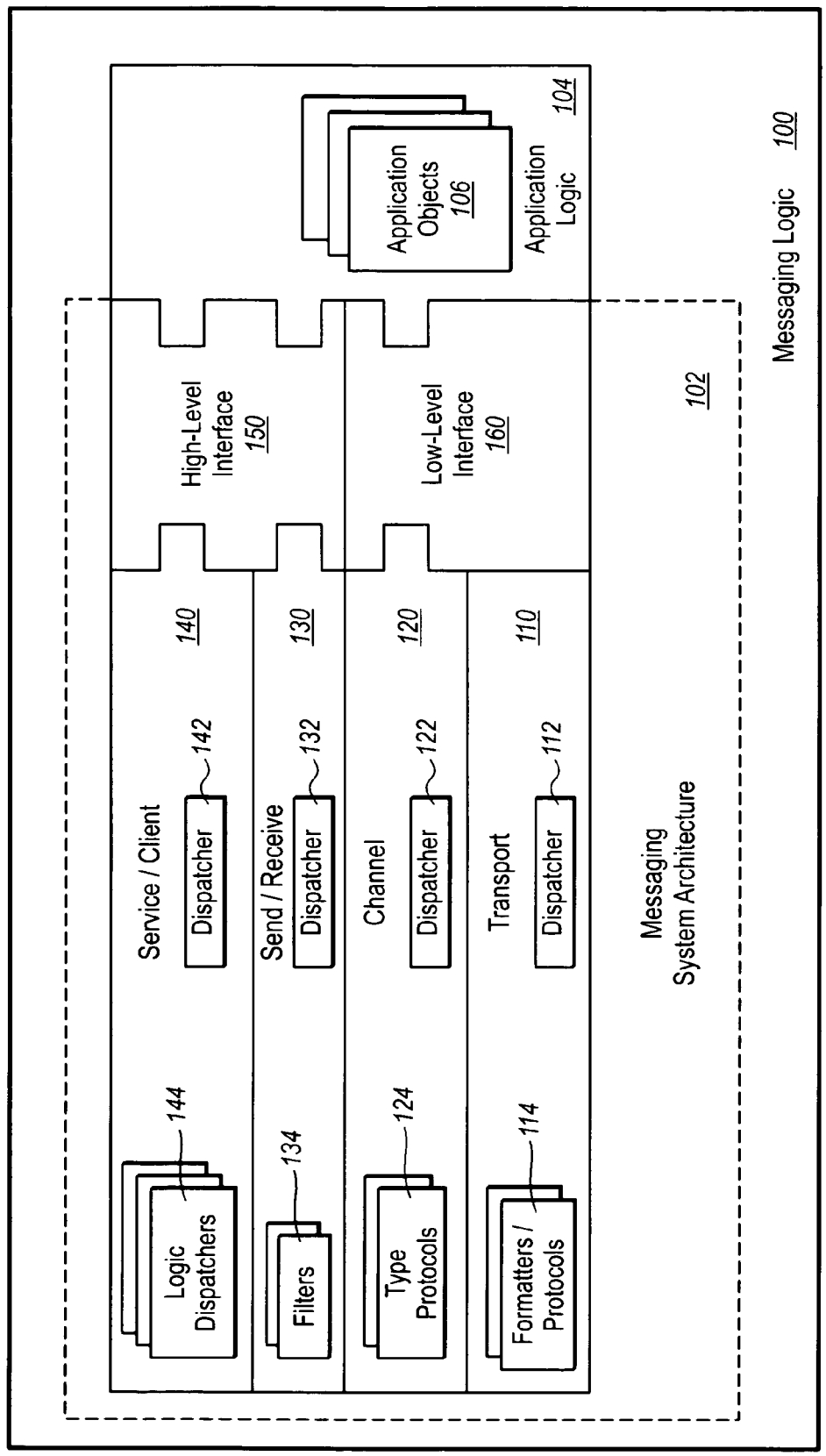
FIG. 1 is a block diagram of an example layered messaging system architecture in accordance with the present invention.

FIG. 1 is a block diagram of example messaging logic 100 that includes layered messaging system architecture 102 and application logic 104. FIG. 1 shows that in one embodiment, messaging system architecture 102 includes four layers: transport 110, channel 120, send/receive 130, and server/client 140. Additional layers may be added if needed. It should also be noted that some or all features of a layer as described in connection with messaging system architecture 102 may be implemented in whole or in part by one of the other layers without departing from the principles and scope of the invention. Accordingly, the specific layers described herein should be understood as exemplary only, and not as limiting. Moreover, example embodiments of the present invention may be described in conjunction with various protocols and specifications, but in all cases these embodiments are exemplary only and should not be interpreted as limiting the invention.

Each of the four layers is aware of the End Point References ("EPRs") of messages that the messaging system architecture processes. Knowledge of the EPRs allows each layer to define specialized behavior. As a result, messaging system architecture 102 represents an extensible and customizable processing environment for typed message-based systems. Although layered messaging processing may be known, a messaging system architecture that is extensible, customizable, and aware of the EPR of a message being processed represents a significant advancement in the art. This architecture allows processing to be tailored according to EPRs in an open-ended manner, given the extensibility of the model.

The bottom layer is transport layer 110. Transport layer 110 retrieves data from specific message transports and produces a well-formed message. The notion of a well-formed message depends on the kind of message. For example, in the Simple Object Access Protocol ("SOAP") embodiment illustrated in FIG. 2, well-formed message are those that conform to an eXtensible Markup Language ("XML") document with the appropriate message parts, such as header and body. Upper layers within messaging system architecture 102 will process using the well-formed message.

Transport layer 110 includes a transport dispatcher 112 for matching a message to a particular transport within the transport layer based on the message's EPR. Individual transports are based on formatter and protocol combinations 114. A formatter is a pluggable component that a particular transport uses to determine the correct serialization and framing that the transport will use to send a message.

The system representation of a message may vary. For example, one embodiment may represent them as they arrive from the transport mechanism or as XML Infosets. Alternatively, message may be represented as fully buffered or having only all the header elements in buffers with a reference to the body, so that the message may be consumed in a stream manner. When a transport is plugged into the messaging system architecture, the plug-in process allows for configuration data to be passed to instances of the transport using open-ended XML.

The next layer is channel layer 120. Channel layer 120 includes channel dispatcher 122 for matching a message to a particular channel within the channel layer based on the message's EPR. Similar to transports within transport layer 110, channels within channel layer 120 are based on type and protocol combinations.

The channel layer 120 can be viewed as an input/output layer-messages get processed as either incoming or outgoing. In the channel layer, serialization and de-serialization are performed to transform the message into a representation that is affine with the processing runtime of the underlying type system for the messaging system architecture and application logic.

In some embodiments, the channel layer may have no knowledge of the network transports being used by the transport layer. In other words, the channel layer 120 can be constrained to operation only on well-formed messages. This means that the channel layer 120 is capable of consuming the output of any software system that produces well-formed messages of the corresponding channel type, for example one of the SOAP channel types as illustrated in SoapChannel 220 in FIG. 2.

Channels can be composed together to represent message exchange patterns ("MEPs"). There is no restriction on the type of MEPs that can be created, such as request/response, send one/receive many, send many/receive one, etc. Channels also can be created to send or receive messages from other channels.

In channel layer 120, messages are actively received. In other words, specific actions are taken to receive a message. Messages are dispatched to a channel through a registration mechanism. Registration gives a channel or channel type to channel dispatcher 122 along with an EPR that represents the resource (e.g., application logic/application object) to which the channel will send messages or from which the channel will receive messages.

As suggested by the illustration of low-level interface 160, the channel layer typically is the lowest level with which application logic 104 interacts. By interacting directly with channel layer 120, application logic 104 needs to explicitly retrieve messages from a channel, and therefore the dispatching to application logic 104 offered by the upper layers is unavailable here. Accordingly, when directly accessing channel layer 120, application logic 104 implements the dispatching logic that otherwise would be provided by send/receive layer 130 and service/client layer 140, which are described in greater detail below.

The third layer is send/receive layer 130. The send/receive layer performs the bulk of the processing when receiving and sending a message. Send/Receive layer 130 includes sender/receiver dispatcher 132 for matching a message to a particular sender/receiver within the layer based on the message's EPR. Sender/Receivers can filter messages using extensible sequences or pipelines of one or more filters 134. There is no restriction on the number of filters. Each installed filter processes the message in turn, with any changes to the message from filtering being immediately available to the next filter.

On a receive, after the message is dispatched to a specific channel, the message is filtered by the appropriate filter pipeline, and then dispatched to user code in corresponding receiver. Similarly, on send, the message is processed by the corresponding sender, filtered by the appropriate filter pipeline and then dispatched to a specific channel. Senders and Receivers can use any channels to send or receive messages.

The fourth layer is Service/Client layer 140. Service/Client layer 140 includes service/client dispatcher 142 for matching a message to a particular logic dispatcher 144 within the layer based on the message's EPR. Logic dispatchers 144 match a message to application logic 104, such as an object or method in application objects 106. This layer offers several additional facilities to simplify the construction of services. For example, service/client layer 140 may retrieve the Web Services Definition Language ("WSDL") description of a relevant service, and it may dispatch on the action of a message. This layer uses metadata to shape the underlying message data and to specify dispatching logic in logic dispatchers 144 for specific messages.

Service/Client layer 140 also correlates messages that are part of a MEP so that developers are not required to write correlation code—that is determine a particular response belongs with a particular request, etc. Each EPR contains an address, potentially an ID of a related message, and a series of opaque XML data. This allows two end points to share the same address, yet each message can be dispatched based on instance data. As a result, developers can handle state information in an activated manner without having to write state determination and processing code. By allowing an EPR to include related message information, developers can avoid writing correlation code.

Send/Receive layer 130 and service/client layer 140 expose high-level interface 150 for interacting with application logic 104. As indicated above, by interacting with send/receive layer 130 and service/client layer 140, application logic 104 takes advantage of the dispatching logic that these layers provide, and therefore need not implement the relatively complex dispatch logic that otherwise would be needed.

Figure 2:
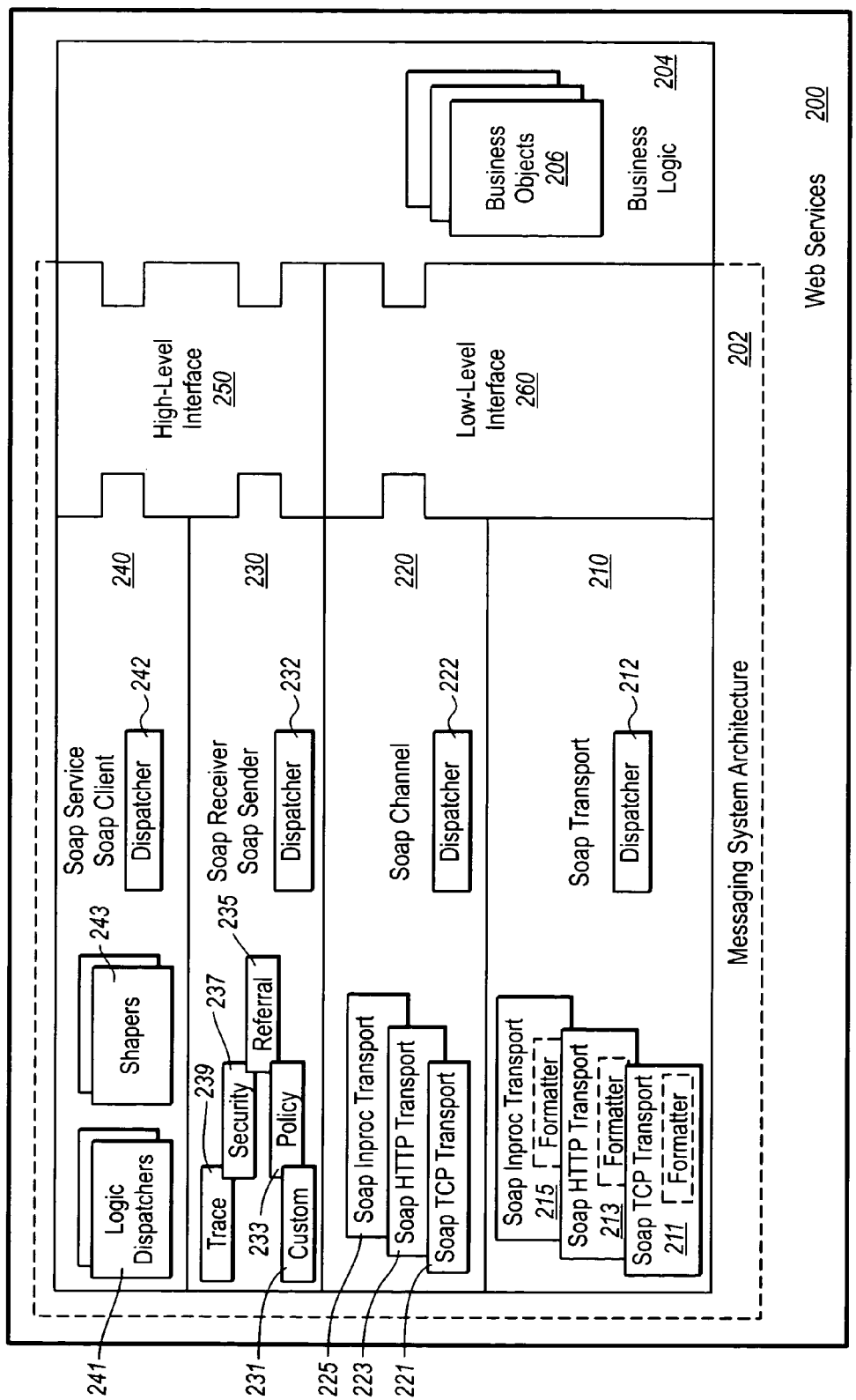
FIG. 2 is an example simple object access protocol implementation of the messaging system architecture shown in FIG. 1.

FIG. 2 is an example simple object access protocol implementation of the messaging system architecture shown in FIG. 1. Web services 200 includes messaging system architecture 202 and business logic 204. The SOAP transport layer 210 includes SoapTcpTransport 211, SoapHttpTransport 213, and SoapInprocTransport 215, each of which in turn includes a formatter, described in more detail below. Of course, the invention is not limited to any particular transport protocol implementation, and therefore the transport layer may support any of a number of other protocols, such as UDP, SMTP, MSMQ, MQ, FTP, file system, named pipes, etc. Note that multiple transports for the same protocol may exist, each having a different formatter. Accordingly, transport dispatcher 212 dispatches messages to the appropriate transport and protocol combination within the transport layer based on the message's EPR, which may suggest use of a particular formatter for a particular protocol.

Formatters decouple the format of a message on the transport mechanism from the particular transport used. For example, HyperText Transfer Protocol ("HTTP") generally is a plain text transport. Accordingly, in the past, by selecting HTTP as a transport, the format of the message, plain text, was selected also. As indicated above, however, formatters allow for new or additional, and potentially custom, formats to be used with various transports. Traditionally, making use of formats other than the ones already associated with a transport required re-implementing the entire transport to support the desired format. Accordingly, formatters allow new transport formats to be added to existing transports, without disturbing the transports themselves or other application programming interfaces ("APIs") within the messaging system architecture. Example formatters could implement compression, SOAP with attachments, Direct Internet Message Encapsulation ("DIME"), and so forth.

One example of EPR-influenced processing is outbound dispatching to a transport mechanism. In a send operation, for example, when the EPR of the ultimate destination is recognized to be in the same process of the sender, a specialized in-process transport can be used, such as SoapInprocTranport 215. This transport is written with full knowledge that its data is being sent within a process. Accordingly, it simply queues the request with no need to copy data around. An advantage of this flexibility is that developers or testers may exercise a complete pipeline of message processing (involving all relevant layers) with no need to transmit a message outside of a process.

The SOAP channel layer 220 includes SoapTcpChannel 221, SoapHttpChannel 223, and SoapInprocTransport 225. Note that similar to SoapTransport 210 multiple channels for the same protocol may exist, each for a different message type. Accordingly, channel dispatcher 222 dispatches messages to the appropriate channel and protocol combination within the channel layer based on the message's EPR, which may suggest use of a particular channel for a particular protocol based on the message type.

Depending on the needs of a particular application, business logic 204, which includes business objects 206, may interface with SOAP channel 220 at a low-level interface 260. The channel layer typically is the lowest level with which business logic 204 interacts. As discussed above in connection with FIG. 1, by interacting directly with SOAP channel 220, business logic 204 needs to explicitly retrieve or pull messages from a channel, and therefore the dispatching to business logic 204 offered by the upper layers is unavailable, and needs to be provided by the business logic itself.

It should be noted that from an API perspective, SOAP transport 210 and SOAP channel 220 represent base classes. SoapTcpTransport 211, SoapHttpTransport 213, and SoapInprocTransport 215 represent implementations of the SOAP transport base class, and SoapTcpChannel 221, SoapHttpChannel 223, and SoapInprocTransport 225 represent implementations of the SOAP channel base class.

The SOAP Receiver/SOAP Sender layer 230 includes senders and/or receivers, depending on the flow of messages. As indicated above, senders and receivers can filter messages using an extensible sequences or pipelines of filters, which in this case include a trace filter 239, a security filter 237, and referral filter 235, a policy filter 233, and one or more custom filters 231. Sender/Receiver dispatcher 232 dispatches messages to the appropriate sequence of filters within the layer based on the message's EPR. For the example embodiment illustrated in FIG. 2, sender/receiver dispatcher 232 also is able to dispatch into business logic 204 at the object level, after or instead of dispatching to an appropriate sequent of filters.

The SOAP Service/SOAP Client 240 includes services and clients, depending on the flow of messages. This layer includes service/client dispatcher 242 for matching a message to a particular logic dispatcher 241 (service) within the layer based on the message's EPR, which in turn dispatches into business logic 204. Logic dispatchers 241 are able to dispatch into business logic 204 at the method level. As indicated above, this layer uses shapers 243 (client) and metadata to shape the underlying message data. The service/client layer also correlates messages that are part of a MEP so that developers are not required to write correlation code.

Similar to the description of FIG. 1, above, the send/receive and service/client layers of messaging system architecture 202 expose high-level interface 250 for interacting with business logic 204 and business objects 206. As indicated above, by interacting with send/receive layer and service/client layer, application logic 204 takes advantage of the dispatching logic that these layers provide, and therefore need not implement the relatively complex dispatch logic that otherwise would be needed.

Figure 3:
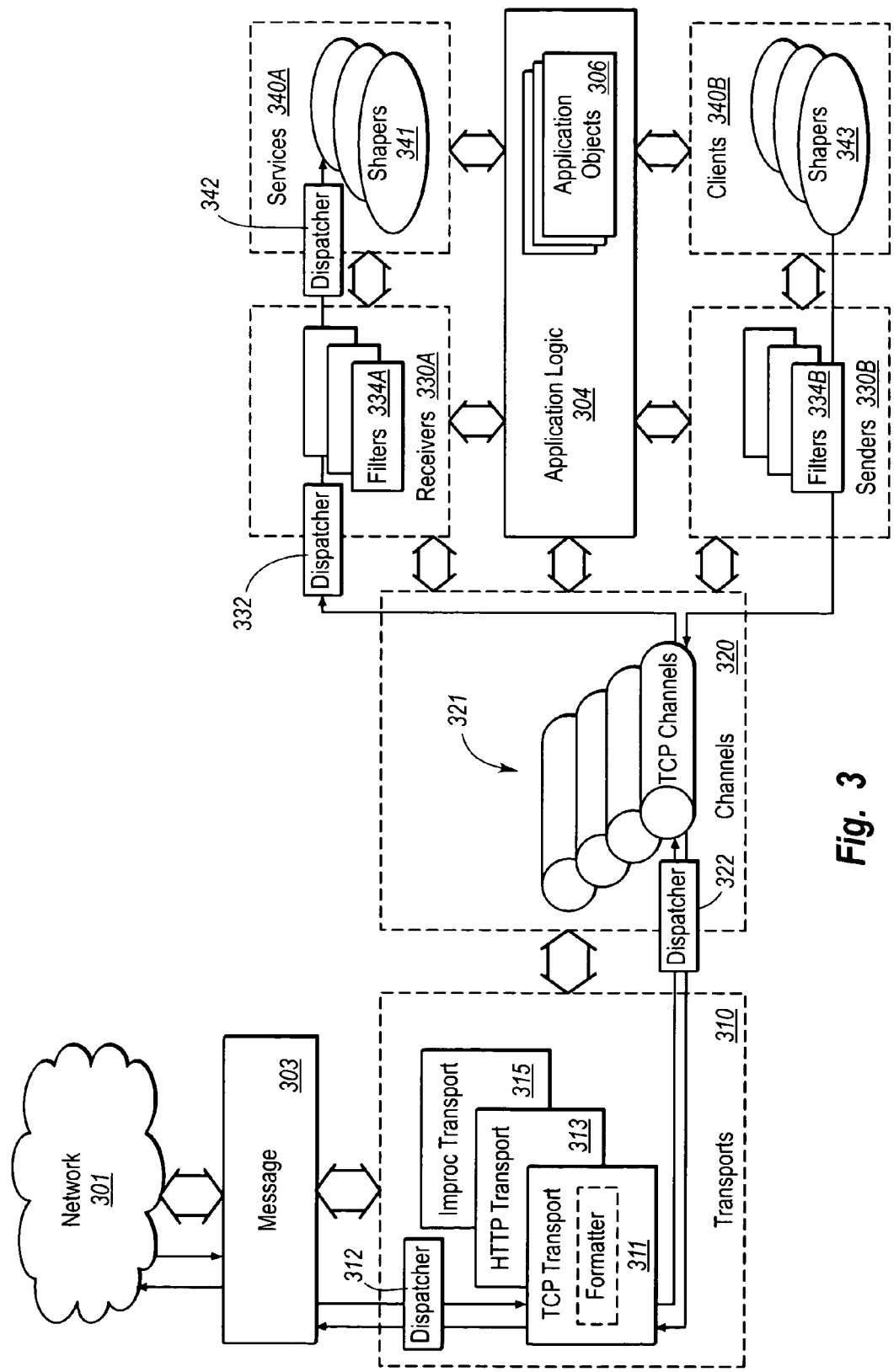
FIG. 3 illustrates an example message flow for the layered messaging system architecture shown in FIG. 1.
Figure 4A:
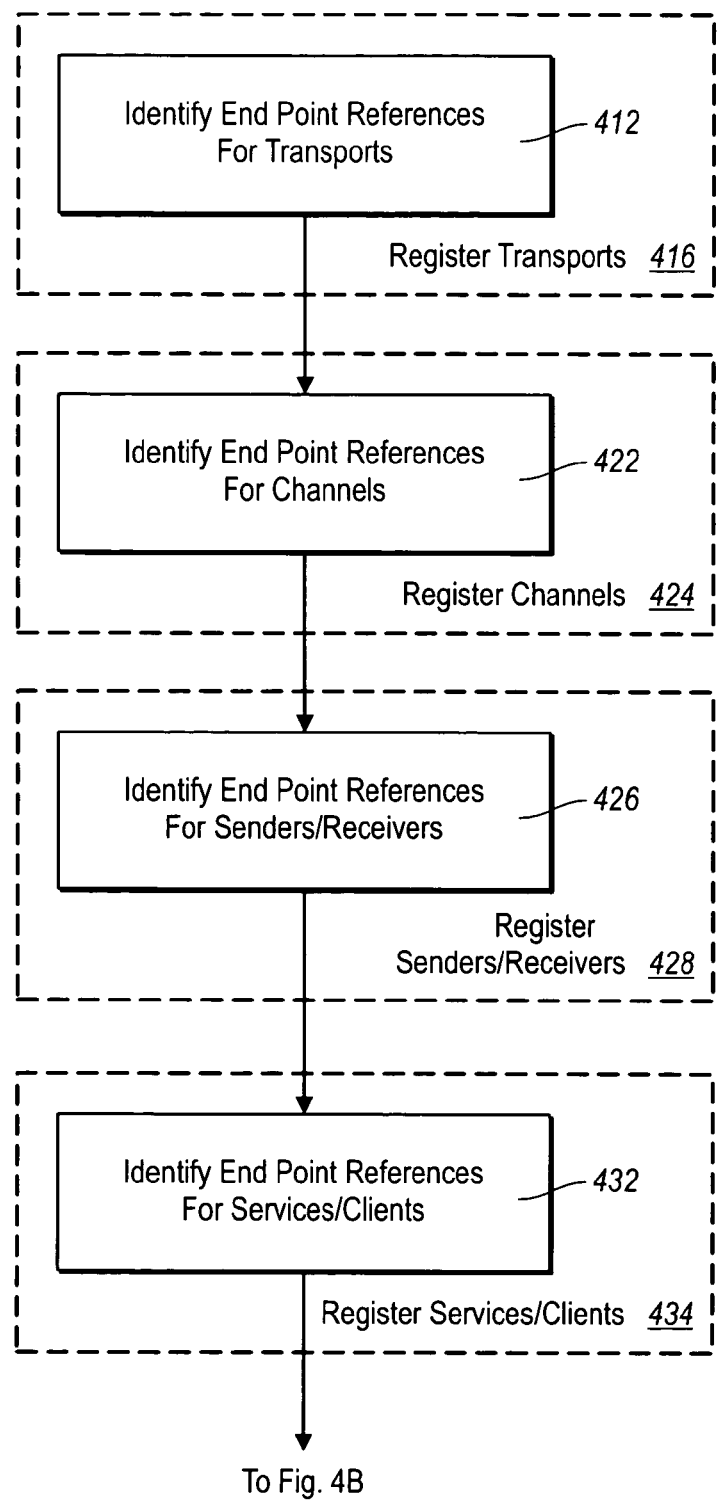
FIG. 4 shows example acts and steps for methods of processing network messages in accordance with the present invention.
Figure 4B:
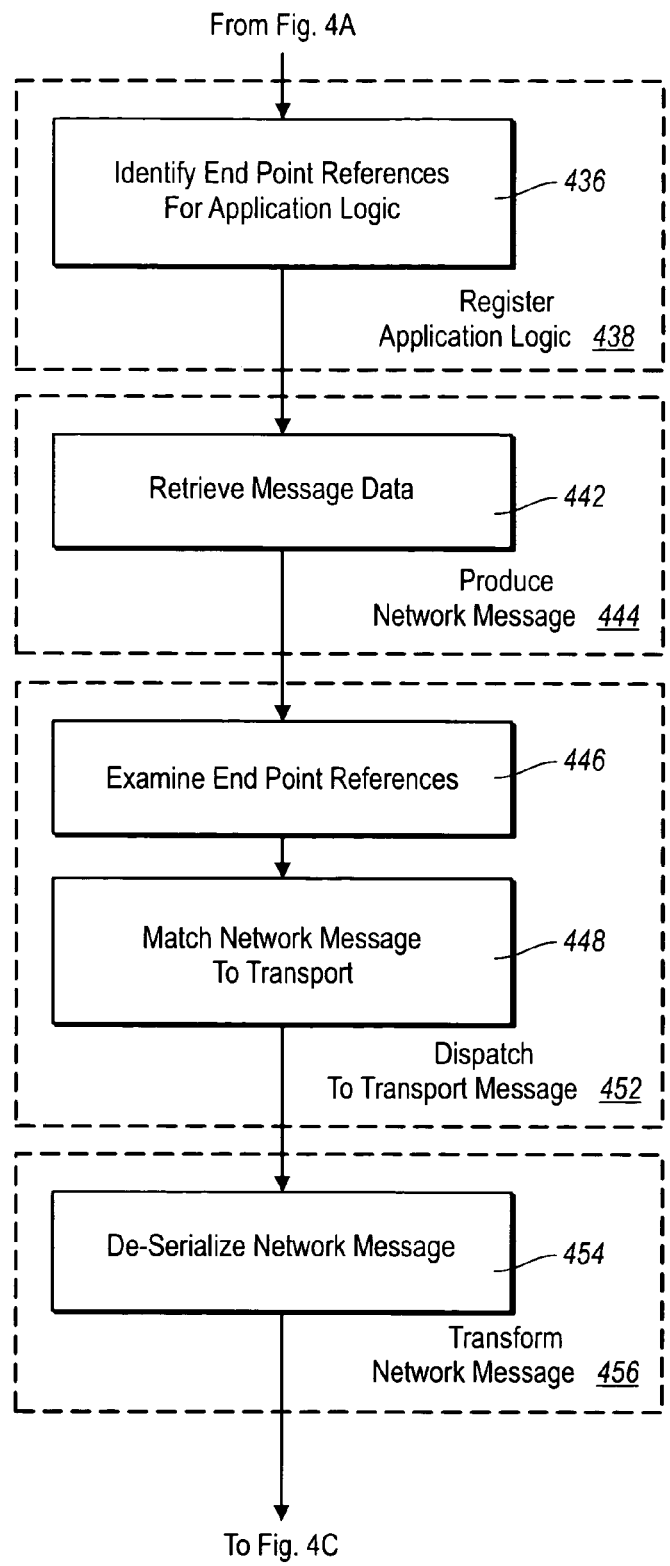
Figure 4C:
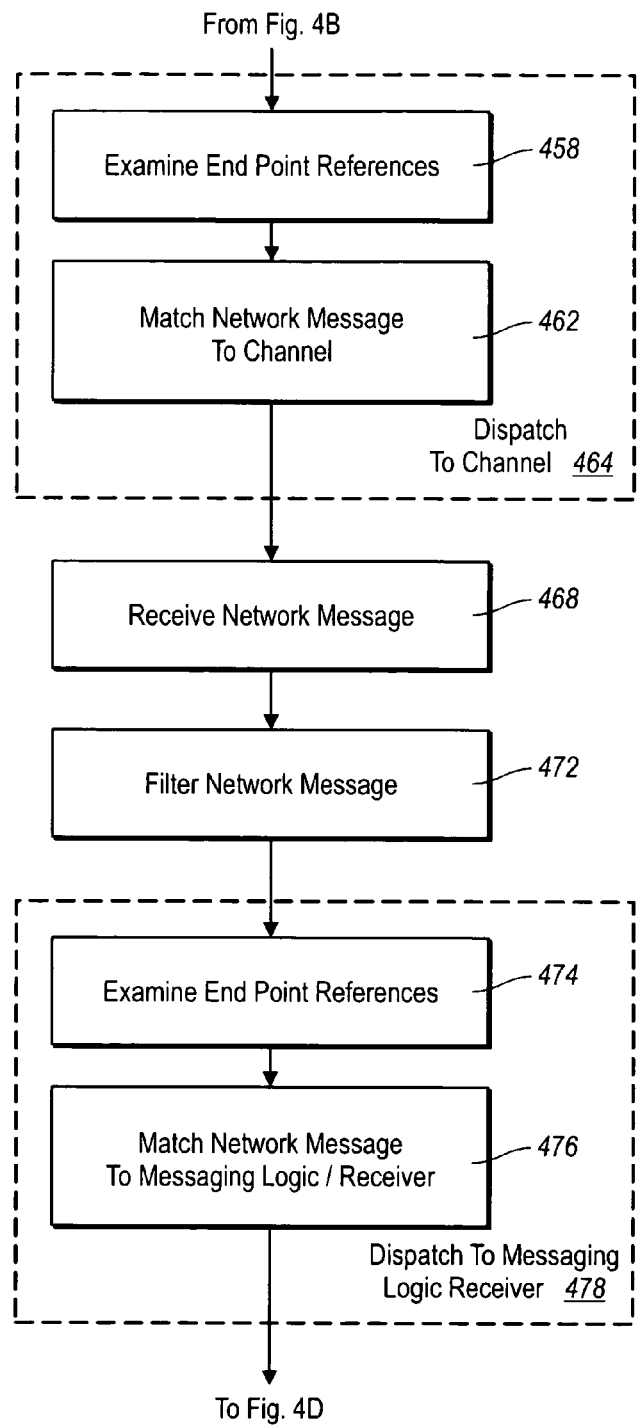
Figure 4D:
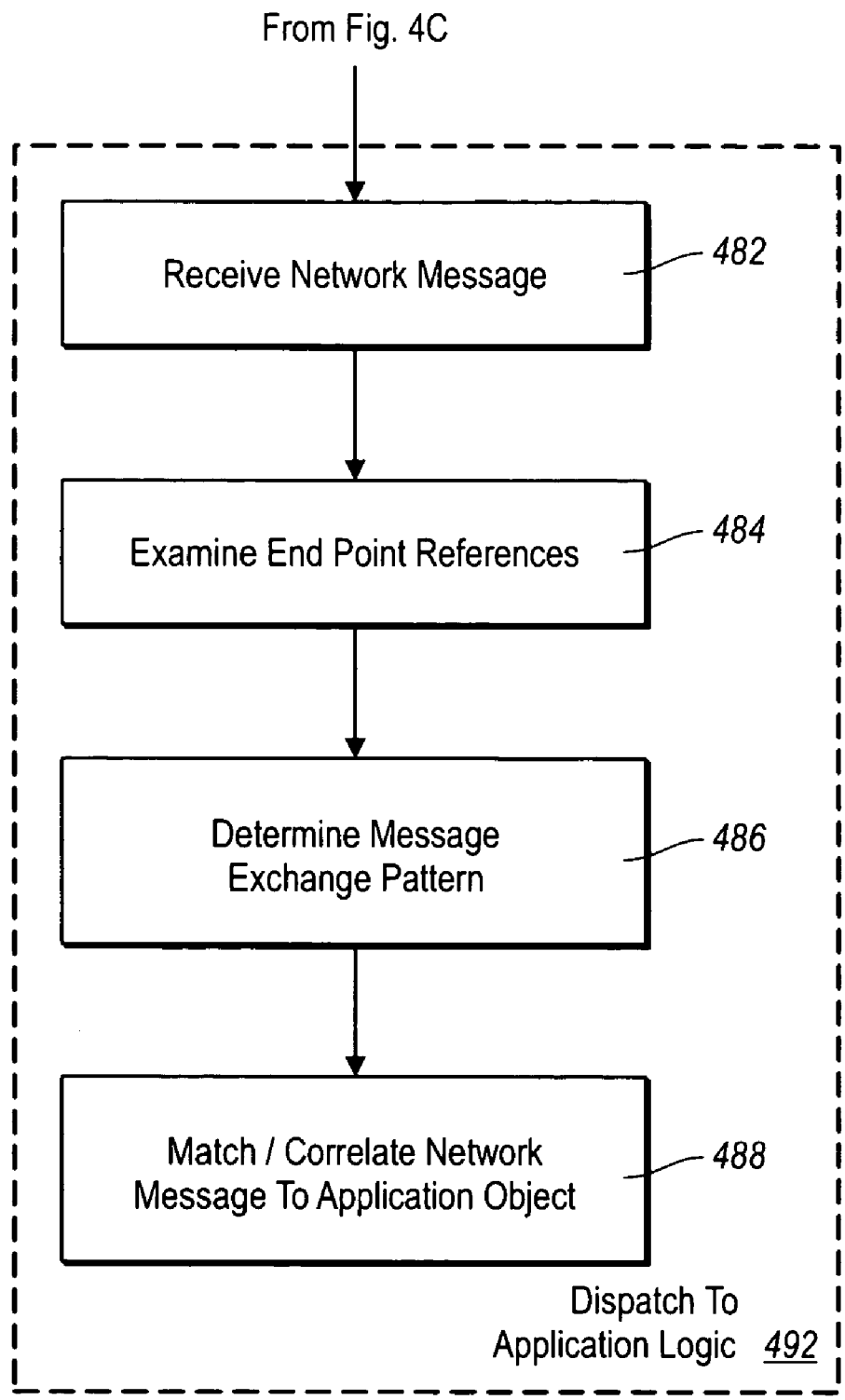

FIG. 3 illustrates an example message flow for the layered messaging system architecture shown in FIG. 1. For an incoming message 303 from network 301, transport dispatcher 312 in transports layer 310 identifies TcpTransport 311 as the appropriate transport for the message. Transport dispatcher 312 examines the message's EPR, which identifies the intended destination (e.g., in SOAP a URL) of the message as well as a collection of end point reference properties (e.g., in SOAP as headers). Other transports, such as HttpTransport 313 and InprocTransport 315 are also available.

Channel dispatcher 322 in channels layer 320 examines the message's EPR and dispatches to the TcpChannel that matches the most EPR headers. In addition to channels for other protocols, channels layer 320 includes multiple TcpChannels 321. Accordingly, each of the TcpChannels is registered for an EPR (destination and zero or more headers). Note that at this stage it is possible for application logic 304, including application objects 306, to interface directly with the message through a low-level channel interface.

Receiver dispatcher 332 dispatches the message to one of the receivers in receivers layer 330A, which as indicated above are implemented as a sequence of one or more filters 334A. Like the TcpChannels 321, each of the receivers is registered for an EPR. Here too, it is possible for application logic 304, including application objects 306, to interface with the message, but in this case through a high-level receiver interface. Accordingly, receiver dispatcher 332 may dispatch the message to the application logic, or as shown in FIG. 3, to services layer 340A.

Service dispatcher 342 dispatches the message to one of the logic dispatchers 341, which in turn dispatches the message to application objects 306 or a method within one of the application objects.

Analogous processing occurs for a message flowing in the opposite direction, from application logic 304 to shapers 343 in clients layer 340B, filters 334B in senders layer 330B, channels layer 320, transports layer 310, and ultimately network 301 for routing to its intended destination. Of course, for an in-process message, the message would be dispatched to InprocTransport 315 rather and being placed on network 301.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

More particularly, FIG. 4 shows example acts and steps for methods of processing network messages in accordance with the present invention. A step for registering (416) a transport with a transport dispatcher may include an act of identifying (412) one or more end point reference properties for a messaging application object (i.e., an intended destination) and the transport to the transport dispatcher. A step for registering (424) a channel with a channel dispatcher may include an act of identifying (422) one or more end point reference properties for a messaging application object and the channel to the channel dispatcher.

A step for registering (428) a receiver or sender with a sender or receiver dispatcher may include an act of identifying (426) one or more end point reference properties for a messaging application object and the receiver or sender to the sender or receiver dispatcher. A step for registering (434) a logic dispatcher with a service or client dispatcher may include an act of identifying (432) one or more end point reference properties for a messaging application object and the logic dispatcher to the service or client dispatcher. A step for registering (438) an application object with a logic dispatcher may include an act of identifying (436) one or more end point reference properties for the application object to the logic dispatcher.

A step for producing (444) a network message within a transport layer of a messaging system architecture may include an act of retrieving (442) message data from a message transport mechanism. The network message includes a collection of end point reference properties. A step for dispatching (452) the network message to a transport may include acts of the transport dispatcher examining (446) the collection of end point reference properties and matching the network message to the transport based on the collection of end point reference properties.

A step for transforming (456) a network message within a channel message layer to make the network message consistent with an underlying type system may include an act of de-serializing (454) the network message. A step for dispatching (464) a network message to a channel may include acts of the channel dispatcher examining (458) the collection of end point reference properties and matching (462) the network message to the channel based on the collection of end point reference properties. The method also may include acts of receiving (468) a network message at a send/receive message layer and filtering (472) the network message with an extensible sequence of one or more filters.

A step for dispatching (478) a network message to a receiver may include acts of a receiver or sender dispatcher examining (474) the collection of end point reference properties and matching (476) the network message to the receiver based on the collection of end point reference properties. Within the sender/receiver layer, a network message also may be dispatched to application logic, without going through the service/client layer. A step for dispatching (492) the network message to application logic may includes acts of receiving (482) the message at a service/client massage layer and a service/client dispatcher examining (484) the collection of end point reference properties and matching the message to a logic dispatcher. The step for dispatching (492) also may include an act of determining (486) that the message is part of a message exchange pattern for which a messaging application object stores state information. The logic dispatcher also examines the collection of end point reference properties and matches/correlates (488) the network message to a messaging application object based on the collection of end point reference properties.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 5:
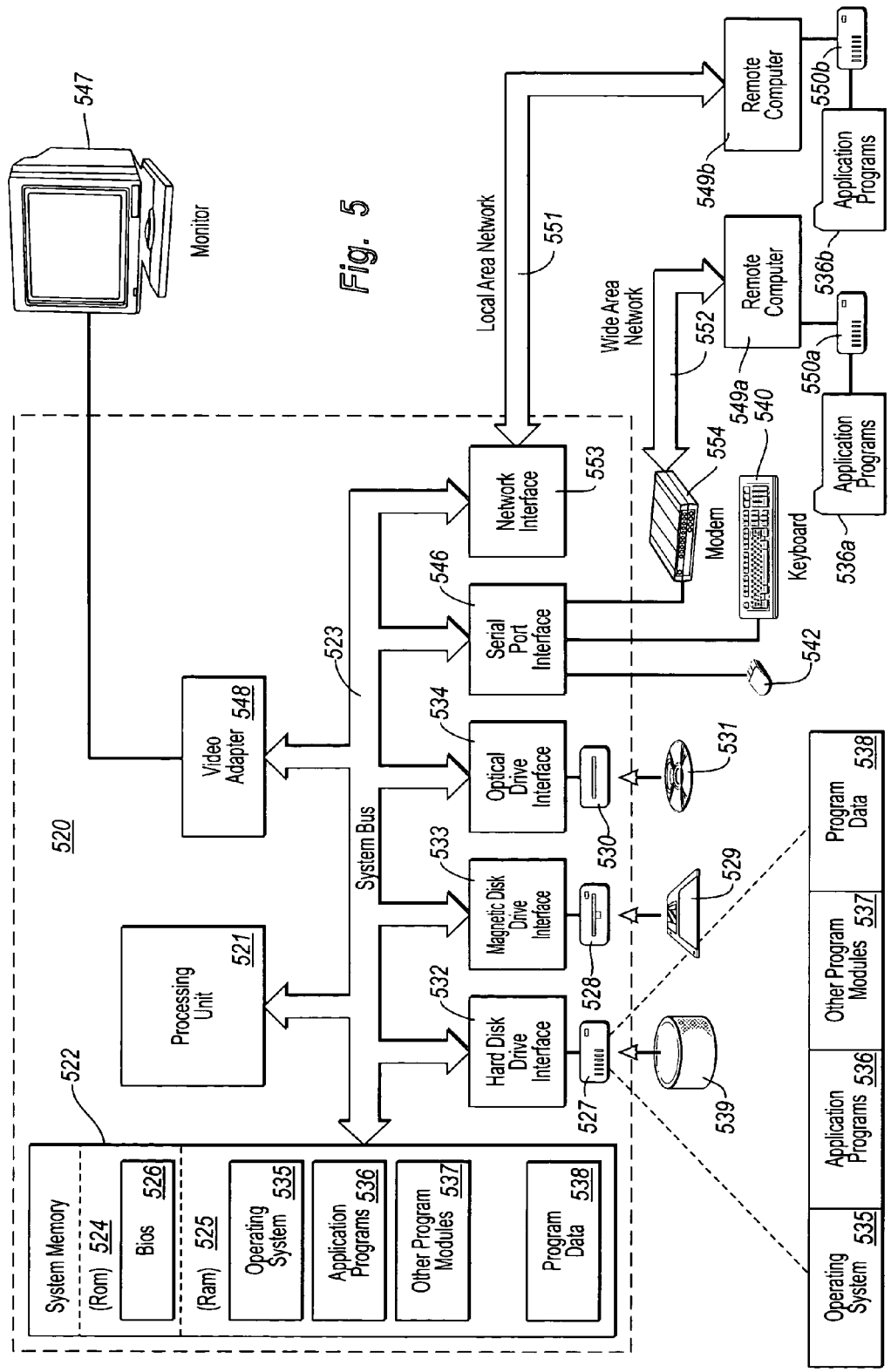
FIG. 5 illustrates an example system that provides a suitable operating environment for the present invention.

FIG. 5 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 5, an exemplary system for implementing the invention includes a general purpose computing device in the form of a conventional computer 520, including a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disc drive 530 for reading from or writing to removable optical disc 531 such as a CD-ROM or other optical media. The magnetic hard disk drive 527, magnetic disk drive 528, and optical disc drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disc 531, other types of computer readable media for storing data can be used, including magnetic cassettes, flash memory cards, digital versatile discs, Bernoulli cartridges, RAMs, ROMs, and the like.

Program code means comprising one or more program modules may be stored on the magnetic hard disk 539, removable magnetic disk 529, removable optical disc 531, ROM 524 or RAM 525, including an operating system 535, one or more application programs 536, other program modules 537, and program data 538. A user may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 549a and 549b. Remote computers 549a and 549b may each be another personal computer, a server, a router, a network PC, a peer device or other common network node, and typically include many or all of the elements described above relative to the computer 520, although only memory storage devices 550a and 550b and their associated application programs 36a and 36b have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method of processing one or more received network messages in a manner that simplifies messaging application logic, the method comprising acts of:

retrieving, at a transport message layer of a messaging system architecture for a computer system, message data from a message transport mechanism to produce a network message that conforms to a particular message specification, the network message comprising a collection of end point reference properties;

de-serializing the conforming message at a channel message layer of the messaging system architecture to produce a message representation that is consistent with an underlying type system of the messaging system architecture;

filtering the message representation at a send/receive message layer of the messaging system architecture, the send/receive message layer using an extensible sequence of one or more filters that produce a filtered message;

receiving the filtered message at a service/client message layer of the messaging system architecture, the service/client message layer examining the collection of end point reference properties and matching the filtered message with messaging application logic corresponding to the collection of end point reference properties so that the messaging application logic need not provide dispatch logic for the filtered message;

determining that the filtered message is part of a message exchange pattern for which one or more messaging application objects of the messaging application logic stores state information; and correlating the filtered message with a least one of the one or more messaging application objects in order to dispatch the filtered message to the messaging application logic.

2. The method as recited in claim 1, wherein each application object comprises one or more object methods, and wherein the service/client message layer matches the filtered message to a specific object method of a specific application object.

3. The method as recited in claim 1, wherein the channel message layer comprises one or more channels, the method further comprising an act of identifying one or more end point reference properties for a resource to which at least one channel will send messages in order to register the at least one channel with a channel dispatcher.

4. The method as recited in claim 1, wherein the send/receive message layer comprises one or more message receivers, the method further comprising an act of identifying one or more end point reference properties for a resource to which at least one message receiver will send messages in order to register the at least one message receiver with a receiver dispatcher.

5. The method as recited in claim 1, wherein the service/client message layer comprises one or more message services, the method further comprising an act of identifying one or more end point reference properties for a resource to which at least one message service will send messages in order to register the at least one message service with a service dispatcher.

6. The method as recited in claim 5, wherein the messaging application logic comprises one or more messaging application objects, and wherein the resource to which the at least one message service will send messages comprises at least one of the one or more messaging application objects.

7. A computer program product comprising one or more computer readable storage media storing computer executable instructions that implement a method of processing one or more received network messages in a manner that simplifies messaging application logic, the method comprising acts of:

retrieving, at a transport message layer of a messaging system architecture for a computer system, message data from a message transport mechanism to produce a network message that conforms to a particular message specification, the network message comprising a collection of end point reference properties, the transport message layer using a formatter to provide a proper serialization and framing when placing the network message on a transport mechanism in accordance with a particular transport protocol;

de-serializing the conforming message at a channel message layer of the messaging system architecture to produce a message representation that is consistent with an underlying type system of the messaging system architecture;

receiving the network message at a send/receive message layer of the messaging system architecture, the send/receive message layer matching the network message to messaging application logic that corresponds to the collection of end point reference properties, wherein the send/receive message layer comprises an extensible sequence of one or more filters that filter the network message;

if the messaging application logic corresponds to a service/client message layer of the messaging system architecture, receiving the network message at the service/client message layer, the service/client message layer matching the network message to messaging application logic that corresponds to the collection of end point reference properties so that the messaging application logic need not provide dispatch logic for the network message;

determining that the network message is part of a message exchange pattern for which one or more messaging application objects of the messaging application logic stores state information; and correlating the network message with the at least one of the one or more messaging application objects in order to dispatch the network message to the messaging application logic.

8. The computer program product as recited in claim 7, wherein the messaging application logic comprises one or more messaging application objects and each of the messaging application objects comprises one or more messaging object methods, and wherein the service/client message layer matches the network message to a specific messaging object method of a specific messaging application object.

9. The computer program product as recited in claim 7, wherein the network message is a simple object access protocol message.

10. The computer program product as recited in claim 7, wherein the service/client message layer comprises one or more message services, the method further comprising an act of identifying one or more end point reference properties for a resource to which at least one message service will send messages in order to register the at least one message service with a service dispatcher.

11. The computer program product as recited in claim 7, wherein the messaging system architecture and the messaging application logic comprise business logic for one or more network services.

12. The computer program product as recited in claim 11, wherein the one or more network services comprise one or more web services.

13. The computer program product as recited in claim 7, wherein the send/receive message layer comprises an extensible sequence of one or more filters that filter the network message.

14. The computer program product as recited in claim 7, the method further comprising acts of:

receiving a new message at a service/client message layer from the messaging application logic;

receiving the new message at the send/receive message layer from the service/client message layer;

receiving the new message at the channel message layer from the send/receive message layer; and receiving the new message at the transport message layer from the channel message layer, the transport message layer using a formatter to provide the proper serialization and framing when placing the new message on a transport mechanism in accordance with a particular transport protocol.

15. A method of processing one or more received network messages in a manner that simplifies messaging application logic, the method comprising steps for:

producing a network message within a transport message layer of a messaging system architecture for a computer system, a network message that conforms to a particular message specification using message data from a message transport, the network message comprising a collection of end point reference properties, the transport message layer using a formatter to provide a proper serialization and framing when placing the network message on a transport mechanism in accordance with a particular transport protocol;

transforming the network message, within a channel message layer of the messaging system architecture, to make the network message consistent with an underlying type system of the messaging system architecture;

dispatching the network message, within a send/receive message layer of the messaging system architecture, to messaging application logic that corresponds to the collection of end point reference properties, wherein the send/receive message layer comprises an extensible sequence of one or more filters that filter the network message;

if the messaging application logic corresponds to a service/client message layer of the messaging system architecture, dispatching the network message, within the service/client message layer, to messaging application logic that corresponds to the collection of end point reference properties so that the messaging application logic need not provide dispatch logic for the network message;

determining that the network message is part of a message exchange pattern for which one or more messaging application objects of the messaging application logic stores state information; and correlating the network message with the at least one of the one or more messaging application objects in order to dispatch the network message to the messaging application logic.

16. The method as recited in claim 15, wherein the messaging application logic comprises one or more messaging application objects, the method further comprising a step for registering at least one messaging application object with at least one logic dispatcher in the service/client message layer by identifying one or more end point reference properties of the at least one messaging application object.

17. The method as recited in claim 16, the method further comprising a step for dispatching the network message to the at least one messaging application object.

18. The method as recited in claim 17, the method further comprising a step for dispatching the network message to the at least one messaging application object comprises acts of:
   the at least one logic dispatcher examining the collection of end point reference properties; and
   the at least one logic dispatcher matching the network message to the at least one messaging application object based on the collection of end point reference properties.

19. The method as recited in claim 18, wherein the service/client message layer comprises one or more logic dispatchers, the method further comprising a step for registering the at least one logic dispatcher with a service dispatcher by identifying one or more end point reference properties of the at least one messaging application object and the at least one logic dispatcher to the service dispatcher.

20. The method as recited in claim 19, the method further comprising a step for dispatching the network message to the at least one logic dispatcher.

21. The method as recited in claim 20, wherein the step for dispatching the network message to the at least one logic dispatcher comprises acts of:
   the service dispatcher examining the collection of end point reference properties; and
   the service dispatcher matching the network message to the at least one logic dispatcher based on the collection of end point reference properties.

22. The method as recited in claim 21, wherein the send/receive message layer comprises one or more receivers, the method further comprising a step for registering at least one receiver with a receiver dispatcher by identifying one or more end point reference properties of the at least one messaging application object and the receiver to the receiver dispatcher.

23. The method as recited in claim 22, the method further comprising a step for dispatching the network message to the at least one receiver.

24. The method as recited in claim 23, wherein the step for dispatching the network message to the at least one receiver comprises acts of:
   the receiver dispatcher examining the collection of end point reference properties; and the receiver dispatcher matching the network message to the at least one receiver based on the collection of end point reference properties.

25. The method as recited in claim 24, wherein the channel message layer comprises one or more channels, the method further comprising a step for registering at least one channel with a channel dispatcher by identifying one or more end point reference properties of the at least one messaging application object and the at least one channel to the channel dispatcher.

26. The method as recited in claim 25, the method further comprising a step for dispatching the network message to the at least one channel.

27. The method as recited in claim 26, wherein the step for dispatching the network message to the at least one channel comprises acts of:
   the channel dispatcher examining the collection of end point reference properties; and
   the channel dispatcher matching the network message to the at least one channel based on the collection of end point reference properties.

28. The method as recited in claim 27, wherein the transport message layer comprises one or more transports, the method further comprising a step for registering at least one transport with a transport dispatcher by identifying one or more end point reference properties of the at least one messaging application object and the at least one transport to the transport dispatcher.

29. The method as recited in claim 28, the method further comprising a step for dispatching the network message to the at least one transport.

30. The method as recited in claim 29, wherein the step for dispatching the network message to the at least one transport comprises acts of:
   the transport dispatcher examining the collection of end point reference properties; and
   the transport dispatcher matching the network message to the at least one transport based on the collection of end point reference properties.

31. The method as recited in claim 15, wherein the messaging application logic comprises one or more messaging application objects and each of the messaging application objects comprises one or more messaging object methods, and wherein the send/receive message layer matches the network message to a specific messaging object method of a specific messaging application object.

32. The method as recited in claim 15, wherein the step for producing the network message comprises an act of retrieving message data from a message transport.

33. The method as recited in claim 15, wherein the step for transforming the network message comprises an act of de-serializing the network message.

34. A computer program product comprising one or more computer readable storage media storing computer executable instructions that implement a messaging system architecture for processing one or more received network messages in a manner that simplifies messaging application logic, the messaging system architecture comprising:
   a transport message layer that retrieves message data from one or more specific message transports and produces a network message conforming to a particular message specification, wherein the network message comprises a collection of end point reference properties, and wherein the transport message layer uses a formatter to provide a proper serialization and framing when placing the network message on a transport mechanism in accordance with a particular transport protocol;
   a channel message layer that communicates with the transport message layer and de-serializes the network message to make the network message consistent with an underlying type system of the messaging system architecture;
   a send/receive message layer that communicates with the channel message layer, applies a sequence of one or more filters to the network message, and dispatches the network message based on the collection of end point reference properties, wherein the send/receive message layer comprises an extensible sequence of one or more filters that filter the network message; and a service/client message layer that communicates with the send/receive message layer and dispatches the network message to messaging application logic based on the collection of end point reference properties so that the messaging application logic need not provide dispatch logic for the network message;

wherein the service/client message layer determines whether the network message is part of a message exchange pattern for which one or more messaging application objects store state information, and if so correlates the network message with the one or more messaging application objects in order to dispatch the network message to the messaging application logic.

35. The computer program product as recited in claim 34, wherein the message transport layer comprises a plurality of transports, including a transmission control protocol transport, a hypertext transfer protocol transport, and an in process transport.

36. The computer program product as recited in claim 35, wherein the channel message layer comprises a plurality of channels, including transmission control protocol channel, a hypertext transfer protocol channel, and an in process channel.

37. The computer program product as recited in claim 34, wherein the channel message layer comprises at least one sequence of a plurality of channels.

38. The computer program product as recited in claim 34, wherein the transport message layer comprises one or more pluggable message formatters, the one or more pluggable message formatters decoupling a received network message's format from the received network message's transport protocol.

39. The computer program product as recited in claim 34, wherein the service/client message layer determines whether the network message is part of a message exchange pattern for which the one or more messaging application objects store state information, and if so correlates the network message with the one or more messaging application objects in order to dispatch the network message to the messaging application logic.

* * * * *